United States Patent Office 3,441,445
Patented Apr. 29, 1969

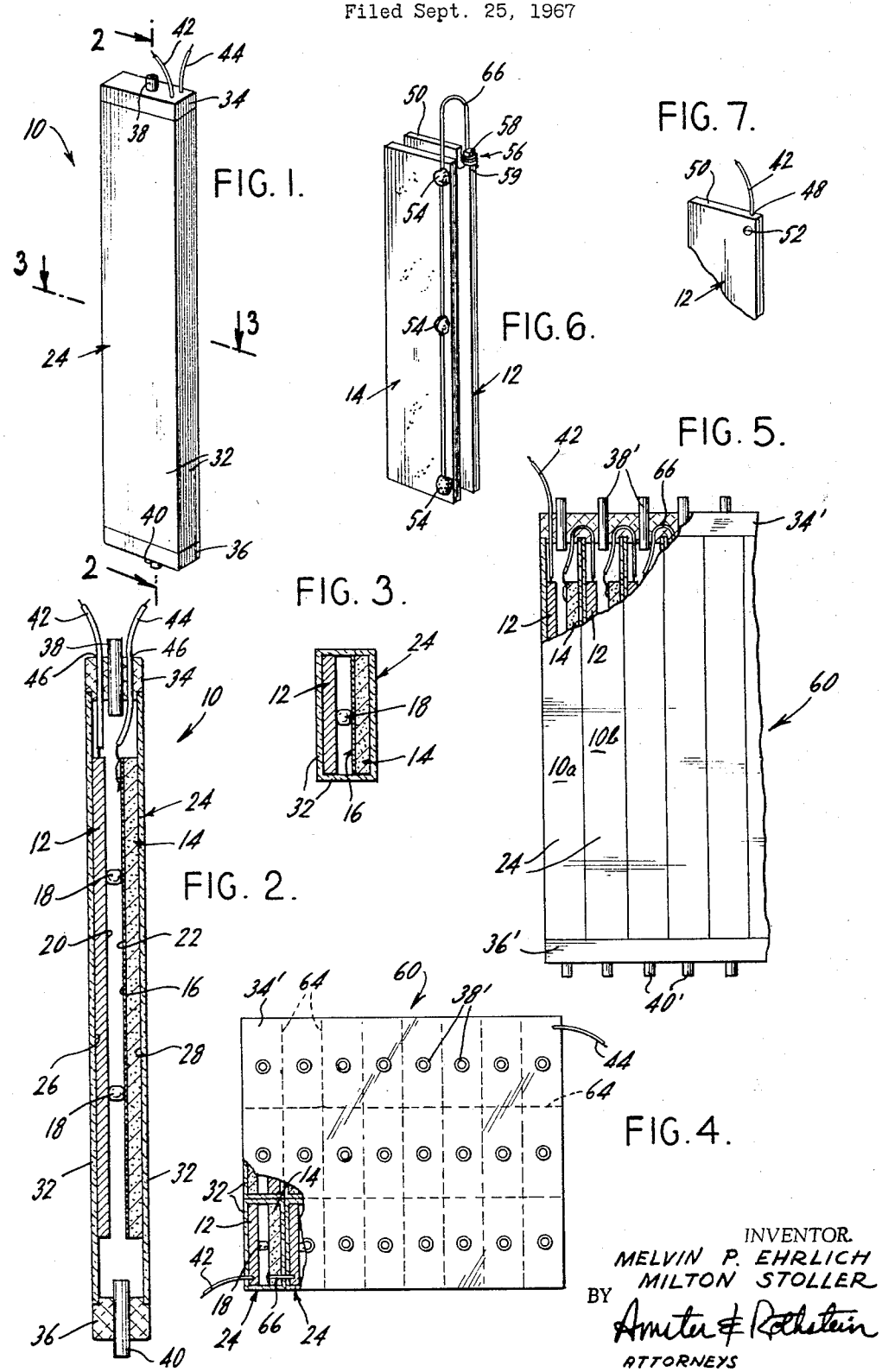

3,441,445
MAGNESIUM-CUPRIC OXIDE PRIMARY
BATTERY
Melvin P. Ehrlich, Plainview, and Milton Stoller, Flushing, N.Y., assignors to Nuclear Research Associates, Inc., New Hyde Park, N.Y., a corporation of Delaware
Continuation-in-part of application Ser. No. 375,804, June 17, 1964. This application Sept. 25, 1967, Ser. No. 674,052
Int. Cl. H01m 17/00
U.S. Cl. 136—100                                5 Claims

ABSTRACT OF THE DISCLOSURE

A battery using sea-water as an electrolyte and an improved magnesium-cupric oxide couple.

---

This is a continuation-in-part of application Ser. No. 375,804, filed June 17, 1964, now abandoned, entitled, Magnesium-Cupric Oxide Primary Battery.

The present invention relates generally to an electrochemical energy source which is activated upon being immersed into an electrolyte, and in particular to a sea-water activated battery.

There are a number of batteries available which are rendered electrochemically active upon immersion in a saline electrolyte, such as salt water. Such batteries are fabricated of appropriate dissimilar metals which are mounted in face to face relation to each other in individual cells and are activated in response to the introduction of the electrolyte into the volume enclosed in each of the cells and between the respective electrodes thereof.

Broadly, it is an object of the present invention to provide an improved electrochemical cell of the aforesaid general construction.

Of recent times, a number of military applications have created a demand for a battery which is relatively inexpensive, has good shelf life and is capable of being placed into operation instantaneously to deliver a prescribed current at relatively closely regulated voltage. When once placed in operation, such battery is required to operate within rather rigid specifications over prolonged periods of time. In a typical application, such battery is required to deliver three hundred milliamperes at a voltage of the order of 15 volts for a period up to 72 hours, with a capability of so operating over a relatively wide temperature range, for example from as low as 0° C. to as high as 30° C. Since such batteries are often incorporated into expendable environments, such as a radio transmitter in a submarine detection float, it is essential that the aforesaid electrical parameters be met using relatively inexpensive materials which are capable of being incorporated into a compact and exceptionally rugged package suitable to be placed in operation by being dropped from an airplane. Moreover, the battery may be used for the first time considerably after its manufacture, requiring a shelf life perhaps as long as seven years.

It is a further object of the present invention to provide a sea water activated battery realizing one or more of the aforesaid objectives. Specifically, it is within the contemplation of the present invention to provide an expendable battery which is fabricated of relatively low cost materials, is suitable for incorporation into an exceptionally compact and rugged package, and is capable of delivering a required current over a relatively prolonged period of use.

An essential part of the present invention is the recognition that sea water, the intended electrolyte for the battery herein, is already a polar solvent, that is a medium already possessive of dissociated ions, and thus an electrically conducting solution at the first instance of introduction into the battery. Thus, in contrast to prior art sea water activated batteries which needlessly employ as a cathode in a dissimilar metallic couple a material having some degree of water solubility to donate ions to this medium (undoubtedly as a carry over from activation of the battery by fresh water) the cathode of the couple of the present invention is distinguished by its selection from a group of materials which is not water-soluble providing noteworthy attending operational advantages and characteristics.

To this end, we have found that an electrochemical cell which is activated by immersion in a saline electrolyte, such as sea water, may be constructed from an anode fabricated of a material selected from the group consisting of magnesium and alloys predominantly of magnesium and a cathode including a body of water-insoluble cupric oxide as a particularly suitable cathode material and a copper coating on at least one surface thereof. The insoluble and non-hydroscopic nature of the cupric oxide contributes to a cell construction particularly suited to have a long shelf life and, it should be noted at no sacrifice to subsequent efficient battery operation. That is, despite the inert character of the cupric oxide there is nevertheless instantaneous electrochemical current producing activity in the battery upon introduction of sea water therein due to the previously mentioned inherent character of sea water as a polar solvent. A plurality of such cells may be incorporated into a battery capable of delivering a required current by including each cathode-anode pair in a casing having entry and exit ports capable of admitting the sea water electrolyte and of discharging the sea water and the reaction products of the electrochemical action produced within the cells. Advantageously, the cells are embodied in an overall package which is constructed to minimize electrical leakage between adjacent cells and corresponding excessive leakage currents which adversely affect the voltage and current capability of the battery. Further, the judicious selection of the materials making up the electrochemical couple assures the capability of operation over prolonged periods of time and avoids polarization as might otherwise occur incident to the production of hydrogen as a result of the electrochemical reaction.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 is a perspective view of a single cell embodying features of the present invention suitable for incorporation into a battery;

FIG. 2 is a sectional view, on an enlarged scale, taken substantially along the line 2—2 of FIG. 1 and showing the internal details of such cell;

FIG. 3 is a sectional view taken substantially along the line 3—3 of FIG. 1 and looking in the direction of the arrows, showing further details of the internal construction of such cell;

FIG. 4 is a plan view, with parts broken away and in section, showing the internal construction of a battery embodying plural cells of the type illustrated in FIGS. 1 to 3 inclusive;

FIG. 5 is a fragmentary side elevational view, with parts broken away, of the battery shown in FIG. 4;

FIG. 6 is a perspective view showing the relationship of a typical cathode and anode as embodied in adjacent battery cells, with the series electrical connection therebetween; and FIG. 7 is a fragmentary perspective view of an anode suitable for incorporation into the present cell.

Preliminary to detail reference to the drawings and a typical illustrative embodiment in accordance with the present invention, a better understanding of the invention may be derived by considering the electrochemical reaction which occurs in a single cell of the present battery. Such single cell embodies a casing which encloses a prescribed volume of the sea water electrolyte which is replenished during the life of the battery. Mounted within the casing is a first electrode of an anode material selected from the group consisting of magnesium and alloys high in magnesium content and a second electrode fabricated of a cathode material including a porous body of cupric oxide having a conductive copper coating on at least one surface thereof, preferably that surface facing the magnesium anode. Experience indicates that the two electrodes should be of comparable shape and dimensions and disposed in uniformly spaced relationship. The shape and spacing of the electrodes as will be discussed hereinafter is subject to a latitude of variation and change, but in general the electrodes should have as large an area as is feasible and the electrode spacing should be relatively small, consistent with precluding electrical malfunction and to achieve the requisite size package for operation in its intended environment.

As is generally understood the chemical reaction that occurs at the magnesium anode is as follows:

$$Mg + H_2O \rightarrow H_2 + Mg(OH)_2 + \text{electrons}$$

Correspondingly, there is a chemical reaction at the cathode which appears to follow the formula:

$$CuO + H_2 \rightarrow Cu + H_2O$$

The hydrogen liberated into the reaction has a tendency to cause polarization at the conductive copper coating on the cathode which would normally terminate the electrochemical action in a relatively short period of time. However, the presence of the mass of cupric oxide in intimate contact with the copper coating is available for reaction with the hydrogen. Thus the cupric oxide, which acts as a depolarizer, absorbs the hydrogen and is converted to copper in accordance with the foregoing reaction. Concurrently, the anode of magnesium or a predominantly magnesium alloy is converted into magnesium hydroxide which is flushed away incident to the passage of the sea water through the corresponding cell. Since the cathode of the cupric oxide body having the copper coating is porous, the copper formed incident to the electrochemical reaction will likewise be porous thus permitting such action to continue through the entire volume of available material making up the cathode. Accordingly, the operation of the individual cells will continue until the magnesium anode is consumed or until the cupric oxide of the cathode is converted into copper, which ever occurs first. The ampere-hour capacity of the cell is dependent upon the respective quantities of magnesium and cupric oxide which should be present in proper ratios with respect to each other to be consumed substantially at the same time at the rated life for the battery. As is generally understood, the quantity of material consumed or converted depends upon the ampere-hours of operation. In a typical sea water battery for use in military applications, the load draws approximately 300 milliamperes at a voltage of approximately 14 volts for a duration of approximately 72 hours. By calculation, continued operation for this period of time will require approximately 9.6 grams of magnesium and approximately 32 grams of cupric oxide. The desired capacity may be attained in a battery having of the order of twenty-four individual cells, with each cell having confronting electrode plate areas of approximately four square inches and an inter-electrode spacing of the order of ⅛ of an inch.

Having particular reference to FIGS. 1–3, 6 and 7, a preferred embodiment of a cell according to the present invention, generally designated 10, employs as an anode 12 a rectangular sheet either of pure magnesium, or a magnesium alloy containing 3% aluminum, 1% zinc, and 96% magnesium. This is a readily available and comparatively inexpensive magnesium alloy which is fabricated in sheet form and suitable for incorporation into the instant battery. In face to face relationship to the magnesium anode 12 is a cathode 14 comprised of a porous sheet or body of cupric oxide having a surface coating 16 of copper, the preferred overall dimension of the cathode 14 being ⅛ of an inch and the copper coating 16 thereon ¹⁄₃₂ of an inch. The copper surface coating may be achieved in several ways, for example by electroplating, sputtering, or heating the cupric oxide body in a hydrogen atmosphere causing copper reduction on the surfaces. Inert spacing members 18, approximately ⅛ of an inch in width, are fixedly interposed between the anode 12 and cathode 14, as by being adhered with a suitable adhesive to the facing surfaces 20 and 22 thereof, and the entire assembly is then housed in an inert material casing 24, such as plastic or the like. The outer respective surfaces 26 and 28 of the anode 12 and cathode 14 as in the case of the spacing members are likewise fixed in position on the confronting inner surfaces 30 of the side walls 32 of the casing 24 using a suitable adhesive. Suitably disposed respectively in end closures 34 and 36 of the casing 24 are small diameter hollow tubes 38 and 40, preferably of an inside diameter of ⅛ of an inch, upper tube 38 functioning as a vent for excessive hydrogen and as an exit port for discharging magnesium hydroxide by-product, and lower tube 40 as a port admitting sea water electrolyte into the cell 10. For other than the military application herein contemplated, where cost is not as critical, the opening of the tube 38 within the cell 10 may be formed out in a flare (not shown) for greater efficiency in flushing magnesium hydroxide from the cell.

As best shown in FIGS. 2 and 7, the electrical connection of the respective cell terminal conductors 42 and 44 to the anode 12 and cathode 14 are made through the casing end closure 34, as for example by disposing each of these conductors through a close tolerance bore 46, and in the case of the anode 12 by fitting an end of the conductor 42 in a drilled hole 48 in the anode upper edge 50 and swaging the anode, as at 52, to firmly hold the conductor 42 in said hole. In the case of the cathode 14 the electrical connection is preferably made by soldering the conductor 44 at plural points along the length of the cathode, as at spaced points 54, so that the connection is electrically effective despite cathode cracking or other body imperfections which might result during cell operation. An equally suitable substitute electrical connection to the anode 12, as shown in FIG. 6, is achieved with a mechanical tie 56 to an ear 58 machined in the upper anode edge 50. The same beneficial effect derived from plural conductor connections along the electrodes such as the solder connections 54 just described, may be obtained by protecting the electrode edge in contact with the conductor from the cell electrochemical process which otherwise would consume this edge. Such protection may be merely an edge coating of an ordinary oil based paint, unaffected by the sea water and yet an effective barrier to chemical reaction, applied to the anode 12 along the conductor connected edge 59 (FIG. 6) as well as to the cathode 14 in replacement for the spaced solder connections 54.

In a preferred battery 60 of 24 series connected cells 10, such as described, and as best shown in FIGS. 4 and 5, the individual cell opposite end closures are replaced by the end closure panels 34' and 36', each having appropriately spaced hollow tubes 38' and 40' force fit in drilled bores 62 opening into each of the cells 10 and also appropriate surface grooving 64 for accommodating the side walls 32 of the individual cell casings 24. The conductor 66 series connecting adjacent cells, taking for example the cell 10a and cell 10b illustrated in FIG. 5, is preferably cast integral with the top panel 34' and is electrically connected, in the manner previously described, between the cathode 14 and anode 12 of said adjacent cells.

From the foregoing, it will be appreciated that a battery 60 comprised of series connected cells 10 of the present invention, such as described, is activated merely by immersion into the ocean and the admission of sea water through the tubes 40' into the individual cells 10. The time for individual cell activation depends only on the time it takes for the sea water to completely fill each cell and for the cell volume contemplated herein will be understood to be in the order of 5 to 10 seconds. Following this, the previously described chemical reaction occurs in each cell 10 to provide the battery 60 with its required electromotive force, and this chemical reaction continues efficiently and without hydrogen depolarization until the respective quantities of the dissimilar metallic magnesium and cupric oxide electrodes 12 and 14 are consumed or converted as previously explained.

Reference in the foregoing description and in the appended claims to magnesium anodes qualifying for use in a battery cell within the contemplation of the present invention will be understood to include not only pure magnesium as can be obtained by and within the limits of known refining techniques, but also alloys predominantly of magnesium and containing other metals, providing only that the nature and percentage content of such other metals do not materially alter the functioning of the predominant magnesium content as contemplated by the present invention, wherefor such alloys predominantly of magnesium, as just defined, will be appreciated as being fairly within the contemplated scope of the present invention.

Further, although a treatment of the cathode for efficient functioning of the novel battery of the present invention has been herein described as including the application thereon of a copper coating, this was not intended as a limitation of the invention but only as exemplary of the several cathode treatments that can be employed. Actually, any of the cathode treatments effective to start electrochemical reactions that are now well known are applicable for use in the novel battery hereof; the crux of the present invention, as clearly emphasized herein, is the specified electrochemical couple employed in a sea water battery and not such aspects as cathode treatments which, in the practice of the invention hereof, can follow the prior art.

For completeness sake, however, other cathode treatments successfully used in the battery hereof will be briefly enumerated. In addition to a coating of copper, the battery was operated efficiently using coatings of: silver; a graphite paste containing a dispersion of copper particles; the same base of graphite paste and a dispersion of silver particles; and a silver-containing conductive paint.

Observed cell operation in batteries having the foregoing coatings was characteristic; the current flow began at the metallic points—where the coating metallic content contacted the copper oxide—and was followed by progressive electrochemical reduction of the copper oxide creating additional conductive paths which gradually spread to encompass the entire surface of the cupric oxide.

As a somewhat different cathode treatment, copper particles were dispersed throughout the porous cupric oxide body 14 and provided efficient battery operation. In this instance, however, it was noted that operation started much slower and increased to full power only after a substantial extent of the cupric oxide was reduced electrochemically to form copper.

In summary, the noted exemplary cathode treatments have in common the use of a conductive coating ("coating" in the context of the foregoing explanation and as used in the appended claims including a "dispersion") which functions to start the electrochemical reaction; thus, a qualifying material is any material which provides an electron-carrying path to the cupric oxide.

It further will be understood that the invention is not to be limited to the specific construction or arrangement of parts shown, but that they may be widely modified with the invention defined by the claims.

What is claimed is:

1. In a battery in combination therewith, an electrochemical cell adapted to be activated by immersion in a saline electrolyte comprising: an anode fabricated of a material selected from the group consisting of magnesium and alloys predominantly of magnesium content; and a cathode consisting essentially of cupric oxide and a conductive coating on at least one surface thereof, said conductive coating selected from the group consisting of copper, silver, a graphite paste containing a disperson of copper particles, a graphite paste and a dispersion of silver particles, and a silver-containing conductive paint.

2. A combination as defined in claim 1 wherein said conductive coating of said cathode is copper.

3. In a battery in combination therewith, an electrochemical cell adapted to be activated by immersion in a saline electrolyte comprising a rectangular anode fabricated of a material selected from the group consisting of magnesium and alloys predominantly of magnesium content and having an inner planar face, a rectangular cathode, said cathode consisting essentially of a body of cupric oxide having an inner planar face, and a coating of copper on said inner planar face of said cathode.

4. A battery adapted to be activated upon immersion in sea water comprising a plurality of electrochemical cells connected in series, each of said cells including a nonconductive and chemically inert casing having entry and exit ports for the flow therethrough of sea water and the reaction products of the electrochemical action produced within the cell, an anode fabricated primarily of magnesium mounted within said casing, a cathode fabricated primarily of a porous body, said porous body consisting essentially of cupric oxide mounted within said casing in face to face relation with said anode, and a copper coating on at least one surface of said cathode.

5. In a battery in combination therewith, an electrochemical cell comprising: an anode fabricated of a material selected from the group consisting of magnesium and alloys predominantly of magnesium content; a cathode consisting essentially of cupric oxide and a conductive coating on at least one surface thereof; and a sea water electrolyte.

References Cited

UNITED STATES PATENTS

| 2,636,060 | 4/1953 | Fischbach et al. |
| 2,655,551 | 10/1953 | Ellis. |
| 2,948,768 | 8/1960 | Ruben. |
| 3,023,262 | 2/1962 | Emmerling et al. |
| 3,048,645 | 8/1962 | Ruben. |
| 3,177,099 | 4/1965 | Kirk et al. |
| 3,343,988 | 9/1967 | Friend _____ 136—100 |

ALLEN B. CURTIS, *Primary Examiner.*

C. F. LeFEVOUR, *Assistant Examiner.*

U.S. Cl. X.R.

136—116, 120